United States Patent [19]
Suenaga

[11] Patent Number: 5,844,869
[45] Date of Patent: Dec. 1, 1998

[54] OPTICAL DISK RECORDING AND REPRODUCING SYSTEM CAPABLE OF ELIMINATING THE INTERRUPTION OR OVERLAPPING OF DATA

[75] Inventor: Shinichi Suenaga, Kanagawa, Japan

[73] Assignee: Sony Corporation, Tokyo, Japan

[21] Appl. No.: 843,755

[22] Filed: Apr. 21, 1997

[30] Foreign Application Priority Data

Apr. 23, 1996 [JP] Japan .................................. 8-101452

[51] Int. Cl.$^6$ .................................................. G11B 17/22
[52] U.S. Cl. ............................................. 369/32; 369/47
[58] Field of Search ................................ 369/32, 48, 49, 369/47, 54, 58, 275.3; 386/124, 126, 106, 96, 39

[56] References Cited

U.S. PATENT DOCUMENTS

| | | | |
|---|---|---|---|
| 5,502,573 | 3/1996 | Fujinami .................................. | 358/339 |
| 5,596,564 | 1/1997 | Fukushima et al. .................. | 369/275.3 |
| 5,659,528 | 8/1997 | Kojima et al. ............................. | 369/32 |
| 5,675,559 | 10/1997 | Maeda et al. ............................. | 369/32 |
| 5,687,160 | 11/1997 | Aotake et al. ........................ | 369/275.3 |

*Primary Examiner*—Tan Dinh
*Attorney, Agent, or Firm*—Frommer Lawrence & Haug, LLP; William S. Frommer

[57] ABSTRACT

A recording and reproducing apparatus is disclosed which is capable of accurately recording and reproducing an image signal and an audio signal to and from a disk even if a non-standard image signal has been supplied, the recording and reproducing apparatus having a storing unit for temporarily storing the audio signal to be recorded on a rewritable-disk-type recording medium and for outputting storage information which is information of the quantity of stored audio signals. A recording/reproducing unit changes the number of sectors of the disk type recording medium within a predetermined number of sectors to record the audio signal stored in the storage unit in synchronization with the image signal. A memory unit memorizes information of the sectors of the disk type recording medium on which the audio signals have been recorded as management information. The recording/reproducing unit reproduces the audio signal recorded on the disk type recording medium in synchronization with the image signal in accordance with management information memorized by the memory unit.

4 Claims, 7 Drawing Sheets

OPTICAL DISK RECORDING AND REPRODUCING SYSTEM CAPABLE OF ELIMINATING THE INTERRUPTION OR OVERLAPPING OF DATA

BACKGROUND OF THE INVENTION

1. Field of the Invention

The present invention relates to a recording and reproducing apparatus for recording and reproducing an image signal and an audio signal to and from an optical disk, a magnetic disk or the like which is a rewritable-disk-type recording medium.

2. Description of the Related Art

In recent years, a recording and reproducing apparatus capable of recording and reproducing an image signal and an audio signal to and from a rewritable-disk-type recording medium (hereinafter simply called disk) has been adapted to a technology with which, for example, a broadcast live program of television is always recorded and a missed scene or a scene required to be watched again can retroactively be watched, with the development of the compression technology.

For example, a recording and reproducing apparatus 300, as shown in FIG. 1, has an image-signal recording system (hereinafter called image recording system) 310, an image-signal recording system (hereinafter called image reproducing system) 320, an audio-signal recording system (hereinafter called audio recording system) 330, an audio-signal reproducing system (hereinafter called audio reproducing system) 340, a system controller 350 for totally controlling the recording and reproducing apparatus 300 and a disk drive 370 for recording image data and audio data on to the disk 360 and reproducing image data and audio data from the disk 360.

Each of outputs from the image-signal recording system 310 and the audio-signal recording system 330 are supplied to the disk drive 370. An output from the disk drive 370 is supplied to the image-signal reproducing system 320 and the audio-signal reproducing system 340.

The system controller 350 totally controls the operations of the recording and reproducing apparatus 300 in accordance with full flag $F_{fu}$ supplied from the image-signal recording system 310, empty flag $F_{em}$ supplied from the image-signal reproducing system 320, transfer permission flag $F_{ok}$ and a vertical synchronizing signal obtained from a synchronization separation circuit 314.

When image data and audio data are recorded on the disk 360, input image data supplied to the image-signal recording system 310 is digitized by an analog/digital (A/D) converter 311, and then synchronizes with the vertical synchronizing signal obtained by the synchronization separation circuit 314 so as to be encoded by a compression processing circuit 312. Image data obtained by the encoding operation performed by the compression processing circuit 312 is written on a FIFO (First in First Out) buffer (hereinafter called image recording buffer) 313.

On the other hand, audio data input to the audio-signal recording system 330 is digitized by an A/D converter 331 so as to be written on FIFO buffer (hereinafter called audio signal recording buffer) 332.

When the image recording buffer 313 has stored image data for one vertical synchronizing period (V), the image recording buffer 313 sets the full flag $F_{fu}$ to be "1" to output the same to the system controller 350.

When the system controller 350 has recognized that image data for 1 V has been stored the image recording buffer 313 in accordance with the full flag $F_{fu}$ (="1") output from the image recording buffer 313, the system controller 350 issues, to the disk drive 370, address to which data must be recorded, commands and the like. Then, the system controller 350 is brought to a waiting state for supply of the transfer permission flag $F_{ok}$ from the disk drive 370.

When the system controller 350 has recognized that the transfer permission flag $F_{ok}$ has been supplied from the disk drive 370, the system controller 350 reads audio data for 1 V stored in the audio signal recording buffer 332 to supply audio data above to the disk drive 370. Moreover, the system controller 350 reads image data for 1 V stored in the image recording buffer 313 to supply the same to the disk drive 370.

The disk drive 370 records audio data supplied from the system controller 350 to the address instructed by the system controller 350 of the disk 360, and then records image data supplied from the system controller 350 to the continued address in the disk 360.

When stored image data for 1 V has been read by the disk drive 370, the image recording buffer 313 temporarily sets the full flag $F_{fu}$ to be "0". When the image recording buffer 313 has stored image data for 1 V in the next 1 V, the image recording buffer 313 again sets the full flag $F_{fu}$ to be "1" and outputs the same to the system controller 350.

When the system controller 350 recognizes that image data for 1 V has been stored in the image recording buffer 313 in accordance with the full flag $F_{fu}$ (="1") supplied from the image recording buffer 313, the system controller 350 reads audio data for 1 V stored in the audio signal recording buffer 332 to supply audio data above to the disk drive 370. The system controller 350 reads image data for 1 V stored in the image recording buffer 313 to supply image data to the disk drive 370.

The disk drive 370 records audio data supplied from the audio signal recording buffer 332 to the continued address in the disk 360. Then, the disk drive 370 records image supplied from the image recording buffer 313 to the following continuous address.

Therefore, the repeated recording operations cause image data and audio data corresponding to image data above to be recorded on the disk 360 for each 1 V.

When an image signal and an audio signal are reproduced from the disk 360, the system controller 350 recognizes that the mode has been set to a reproducing mode in accordance with a key operation performed by a user. Then, the system controller 350 issues address, at which data to be reproduced from the disk 360 has been recorded, commands and the like to the disk drive 370. Then, the system controller 350 is brought to a waiting state for supply of the transfer permission flag $F_{ok}$ from the disk drive 370.

The disk drive 370 supplies the transfer permission flag $F_{ok}$ to the system controller 350 in accordance with the address, command and the like supplied from the system controller 350. Then, the disk drive 370 reproduces audio data for 1 V from the foregoing address, and then reproduces image data for 1 V from the address following the audio data.

When the system controller 350 has recognized that the transfer permission flag $F_{ok}$ has been supplied from the disk drive 370, the system controller 350 writes audio data reproduced by the disk drive 370 onto a FIFO buffer (hereinafter called audio reproducing buffer) 341. The system controller 350 writes image data reproduced by the disk drive 370 onto a FIFO (hereinafter called image reproducing buffer) 321 of the image-signal reproducing system 320.

The image reproducing buffer 321 sets the empty flag $F_{em}$ to be "1" to output the same to the system controller 350 until it stores image data for 3 V to require the system controller 350 to transfer data.

As a result, the system controller 350 writes audio data reproduced by the disk drive 370 onto the audio reproducing buffer 341 for units of 1 V. Moreover, the system controller 350 writes image data reproduced by the disk drive 370 onto the audio reproducing buffer 321 for units of 1 V.

When the image reproducing buffer 321 has stored image data for 3 V, the image reproducing buffer 321 sets the empty flag $F_{em}$ to be "0" so as to output the same to the system controller 350. Moreover, the image reproducing buffer 321 temporarily completes the requirement made to the system controller 350 to transfer data, and then outputs image data for 1 V to the expansion circuit 322.

Also the audio reproducing buffer 341 simultaneously outputs audio data for 1 V to a D/A converter 342.

Then, the image reproducing buffer 321 sets the empty flag $F_{em}$ to be "1" so as to output the same to the system controller 350 to again require the system controller 350 to transfer data.

As a result, the system controller 350 writes audio data and image data for 1 V reproduced by the disk drive 370 onto the audio reproducing buffer 341 and the image reproducing buffer 321.

The expansion circuit 322 of the image-signal reproducing system 320 synchronizes with the vertical synchronizing signal obtained by the synchronization separation circuit 314 to decode image data supplied from the image reproducing buffer 321. The D/A converter 323 converts image data decoded by the expansion circuit 322 into an analog signal to output the analog signal to a monitor (not shown).

The D/A converter 342 of the audio-signal reproducing system 340 converts audio data supplied from the audio reproducing buffer 341 into an analog signal so as to output the analog signal to a loud speaker system (not shown).

Therefore, the foregoing repeated reproducing operations enable a reproduced image to be output and displayed on the monitor, so that voice is output from the loud speaker unit in synchronization with the reproduced image. As a result, a user is able to instantaneously and retroactively watch the current scene.

The recording and reproducing apparatus 300 is structured such that the address in the disk 360 and audio data and image data for 1 V are made to relate to each other when data above is recorded on the disk 360. Moreover, peculiar address in the disk 360 is given to each sector and defined that, for example, 512 bytes form one sector.

That is, a predetermined number M of sectors is assigned to audio data for 1 V, while a predetermined number N of sectors is assigned to image data for 1 V.

Specifically, when image data compressed at a compression ratio of about 1/25 and two-channel audio data quantized with 16 bits are recorded on the disk 360 defined that, for example, 512 bytes form one sector, the recording and reproducing apparatus 300, as shown in FIG. 2, regulates file size $S_f$ of voice for 1 V and an image for 1 V to be 32 sectors so as to continuously record data on the disk 360 with format block B regulated such that 32 sectors form file size $S_f$.

The format block B is divided into block $B_A$ formed by five sectors (=2560 bytes) and block $B_B$ formed by 27 sectors (=13824 bytes). Image data for 1 V sampled at 13.5 MHz and obtained by compressing a component full color signal for the full screen size to be not more than 13824 bytes is recorded in the block $B_B$. Audio data for 1 V sampled with a frequency which is 1/384 of 13.5 MHz, that is, sampled with 35.15625 KHz, is recorded in the block $B_A$.

At this time, audio data for 1 V has a size of 585.9375 words (=2343.75 bytes) involving fraction.

Therefore, the recording and reproducing apparatus 300 is structured such that 586 words (=2344 bytes) of audio data are assigned to each format block B for 15 V of 16 V, while 585 words (=2340 bytes) of audio data are assigned to the residual format block B for 1 V.

Moreover, whether or not 586 words of audio data or 585 words of audio data have been recorded on each format block B recorded on the disk 360 is managed by the system controller 350.

Therefore, audio data for 1 V and image data for 1 V are, in units of the format blocks B formed by 32 sectors, sequentially recorded on the disk 360, so that 586 words of audio data are recorded for 15 V and 585 words of audio data are recorded for the following 1 V in each 15 V.

When audio data is reproduced from the disk 360, the system controller 350 controls the disk drive 370 to reproduce data for the block $B_A$ of the format block B recorded on the disk 360, that is, to reproduce audio data in units of 5 sectors (=2560 bytes). In accordance with information managed when data has been recorded, 568 words (=2344 bytes) of audio data among 2560 bytes of data reproduced by the disk drive 370 or 585 words (=2340 bytes) of audio data are written on the audio reproducing buffer 341.

However, when the recording and reproducing apparatus described in the background has received an image signal in a non-standard system, for example, an image signal in which the number of horizontal scanning lines is not 262.5 in the NTSC system, the time period for 1 V is changed. Therefore, the number of samples can be unintentionally changed when an audio signal is sampled by the foregoing recording and reproducing apparatus. As a result, the recording and reproducing apparatus cannot perform management when audio data above is recorded.

Therefore, when an image signal in the non-standard system has been supplied to the recording and reproducing apparatus, audio data and image data are recorded on the disk, while voice and the image are interrupted or voice and the image overlap. Therefore, high quality voice and image cannot be obtained from the disk on which audio data and image data have been recorded by the recording and reproducing apparatus.

Moreover, the recording and reproducing apparatus must perform management for each format block when audio data above is recorded. That is, the recording and reproducing apparatus must, for each 1 V, manage the number of data items and the number of sectors recorded on the disk. Moreover, an excessively large quantity of data must be managed.

As a result, the recording and reproducing apparatus involves the system controller for performing the foregoing management being required to bear a heavy load. Thus, the processing efficiency cannot be improved.

SUMMARY OF THE INVENTION

In view of the foregoing, an object of the present invention is to achieve the following objects.

That is, an object of the present invention is to provide a recording and reproducing apparatus capable of accurately recording and reproducing an image signal and an audio signal to and from a disk even if a non-standard image signal has been supplied.

Another object of the present invention is to provide a recording and reproducing apparatus having an improved processing efficiency.

In order to achieve the foregoing objects, according to one aspect of the present invention, there is provided a recording and reproducing apparatus for recording an image signal and an audio signal on to a rewritable-disk-type recording medium while synchronizing the image signal and the audio signal with each other and for reproducing an image and voice from a rewritable-disk-type recording medium having image signals and audio signals recorded thereon while synchronizing the image and the voice with each other, the recording and reproducing apparatus including: storage means for temporarily storing an audio signal to be recorded on the disk type recording medium and outputting storage information which is information of the quantity of the stored audio signals; recording means for changing the number of sectors of the disk type recording medium for recording the audio signal within a predetermined number of sectors in accordance with storage information when the recording means records the audio signals stored in the storage means on to the disk type recording medium; memory means for memorizing information of the number of the sectors of the disk type recording medium in which the audio signals have been recorded, the information being stored as management information; and reproducing means for reproducing the audio signals recorded on the disk type recording medium in accordance with management information stored by the memory means.

In order to achieve the foregoing objects, according to another aspect of the present invention, there is provided a recording and reproducing apparatus for recording an image signal and an audio signal on to a rewritable-disk-type recording medium while synchronizing the image signal and the audio signal with each other and for reproducing an image and voice from a rewritable-disk-type recording medium having image signals and audio signals recorded thereon while synchronizing the image and the voice with each other, the recording and reproducing apparatus including: storage means for temporarily storing an audio signal to be recorded on the disk type recording medium and outputting storage information which is information of the quantity of the stored audio signals; recording means for changing the number of sectors of the disk type recording medium for recording the audio signal within a predetermined number of sectors in accordance with storage information when the recording means records the audio signals stored in the storage means on to the disk type recording medium; and reproducing means for reproducing the audio signals recorded on the disk type recording medium, wherein the recording means records a predetermined code in a residual sector in a case where the number of the sectors for recording the audio signals is smaller than a predetermined number of sectors, and the reproducing means reproduces, from the disk type recording medium, only audio signals from which the predetermined code has been removed.

Other objects, features and advantages of the invention will be evident from the following detailed description of the preferred embodiments described in conjunction with the attached drawings.

DESCRIPTION OF THE PREFERRED EMBODIMENTS

Embodiments of the present invention will now be described with reference to the drawings.

Figure 1:
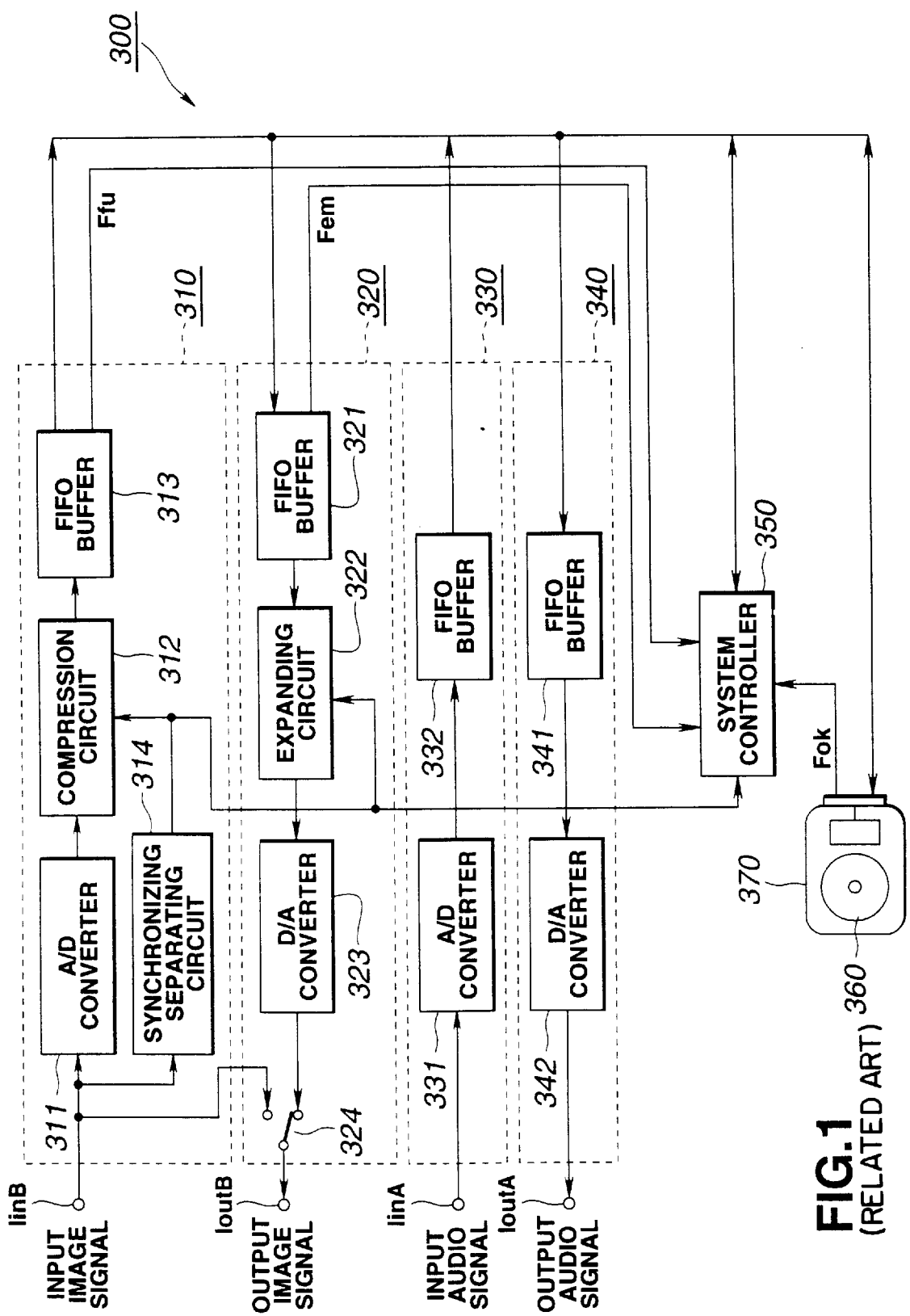
FIG. 1 is a block diagram showing the structure of a conventional recording and reproducing apparatus.
Figure 2:
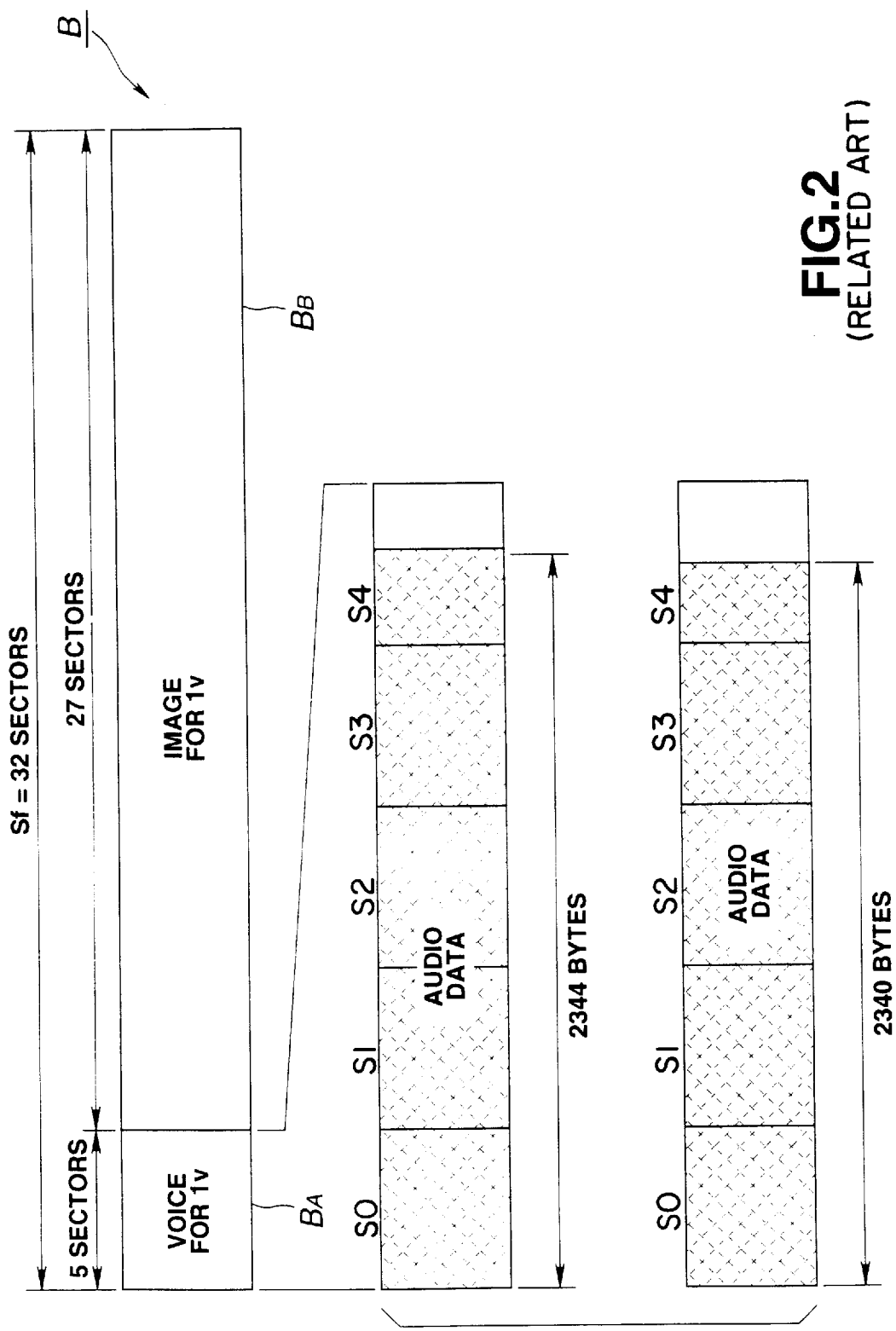
FIG. 2 is a diagram showing a disk format for use in the conventional recording and reproducing apparatus.
Figure 3:
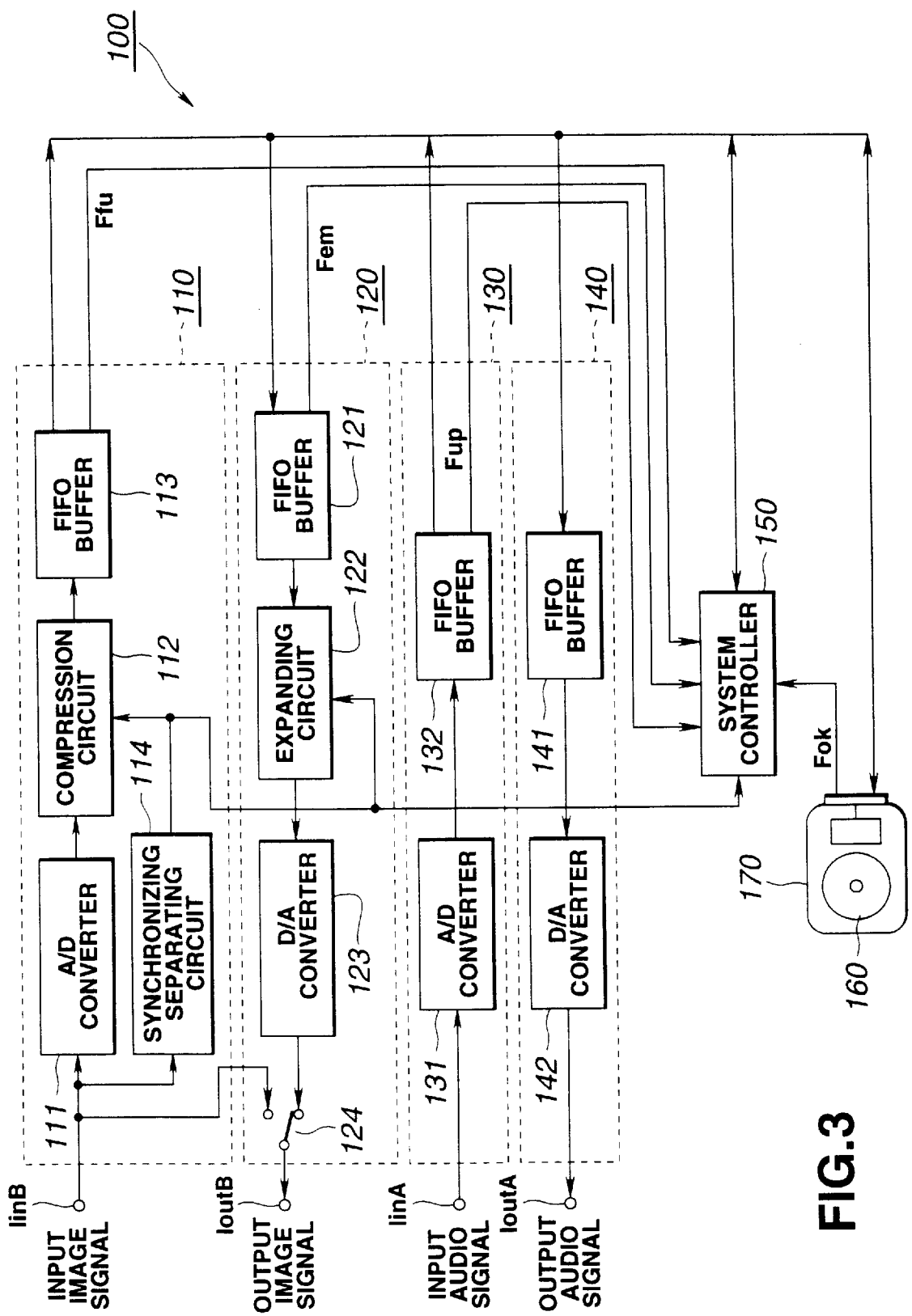
FIG. 3 is a block diagram showing the structure of a recording and reproducing apparatus according to the present invention.

A recording and reproducing apparatus according to the present invention is applied to, for example, a recording and reproducing apparatus 100 as shown in FIG. 3.

The recording and reproducing apparatus 100 is an apparatus capable of recording and reproducing an image signal and an audio signal to and from a disk 160 of a type defined such that 512 bytes form one sector. The recording and reproducing apparatus 100 has a system (hereinafter called image recording system) 110 for recording an image signal, a system (hereinafter called image reproducing system) 120 for reproducing an image signal, a system (hereinafter called audio recording system) 130 for recording an audio signal, a system (hereinafter called audio reproducing system) 140 for reproducing an audio signal, a system controller 150 for totally controlling the operations of the recording and reproducing apparatus 100, and a disk drive 170 for recording image data and audio data to the disk 160 and reproducing image data and audio data from the disk 160.

The image recording system 110 has an A/D converter 111 and a synchronization separation circuit 114 to each of which an image signal supplied through input terminal $I_{inB}$ is supplied, a compression processing circuit 112 to which an output from each of the A/D converter 111 and the synchronization separation circuit 114 is supplied and a FIFO buffer (hereinafter called image recording buffer) 113 to which an output from the compression processing circuit 112 is supplied. An output from the image recording buffer 113 is supplied to a disk drive 170. An output from the synchronization separation circuit 114 is also supplied to the image reproducing system 120 and the system controller 150.

The image reproducing system 120 has a FIFO buffer (hereinafter called image reproducing buffer) 121, an expansion circuit 122 to which an output from each of the image reproducing buffer 121 and the synchronization separation circuit 114 of the image recording system 110 is supplied, a D/A converter 123 to which an output from the expansion circuit 122 is supplied, and a switch 124 for switching and outputting an output from the D/A converter 123 and an image signal supplied through the input terminal $I_{inB}$. An output from the switch 124 is, through output terminal $I_{outB}$, supplied to a monitor (not shown).

The audio recording system 130 has an A/D converter 131, to which the audio signal supplied through the input terminal $I_{inA}$ is supplied and a FIFO buffer (hereinafter called audio recording buffer) 132 to which an output from the A/D converter 131 is supplied. An output from the audio recording buffer 132 is supplied to the disk drive 170.

The audio reproducing system 140 has a FIFO buffer (hereinafter called audio reproducing buffer) 141 to which an output from the disk drive 170 is supplied and a D/A converter 142 to which an output from the audio reproducing buffer 141 is supplied. An output from the D/A converter 142 is, through the output terminal $I_{outA}$, supplied to a loud speaker unit (not shown).

In the recording and reproducing apparatus 100, the system controller 150 receives full flag $F_{fu}$ supplied from the image recording buffer 113, empty flag $F_{em}$ supplied from the image reproducing buffer 121 and transfer permission flag $F_{ok}$ supplied from the disk drive 170. Moreover, upper flag $F_{up}$ supplied from the audio recording buffer 132 is received by the system controller 150. In accordance with each of the flags, the system controller 150 controls the output to the disk drive 170 of the image recording buffer 113, the output to the image reproducing buffer 121 of the disk drive 170, the output to the disk drive 170 of the audio recording buffer 132 and the output to the audio reproducing buffer 141 of the disk drive 170.

Figure 4:
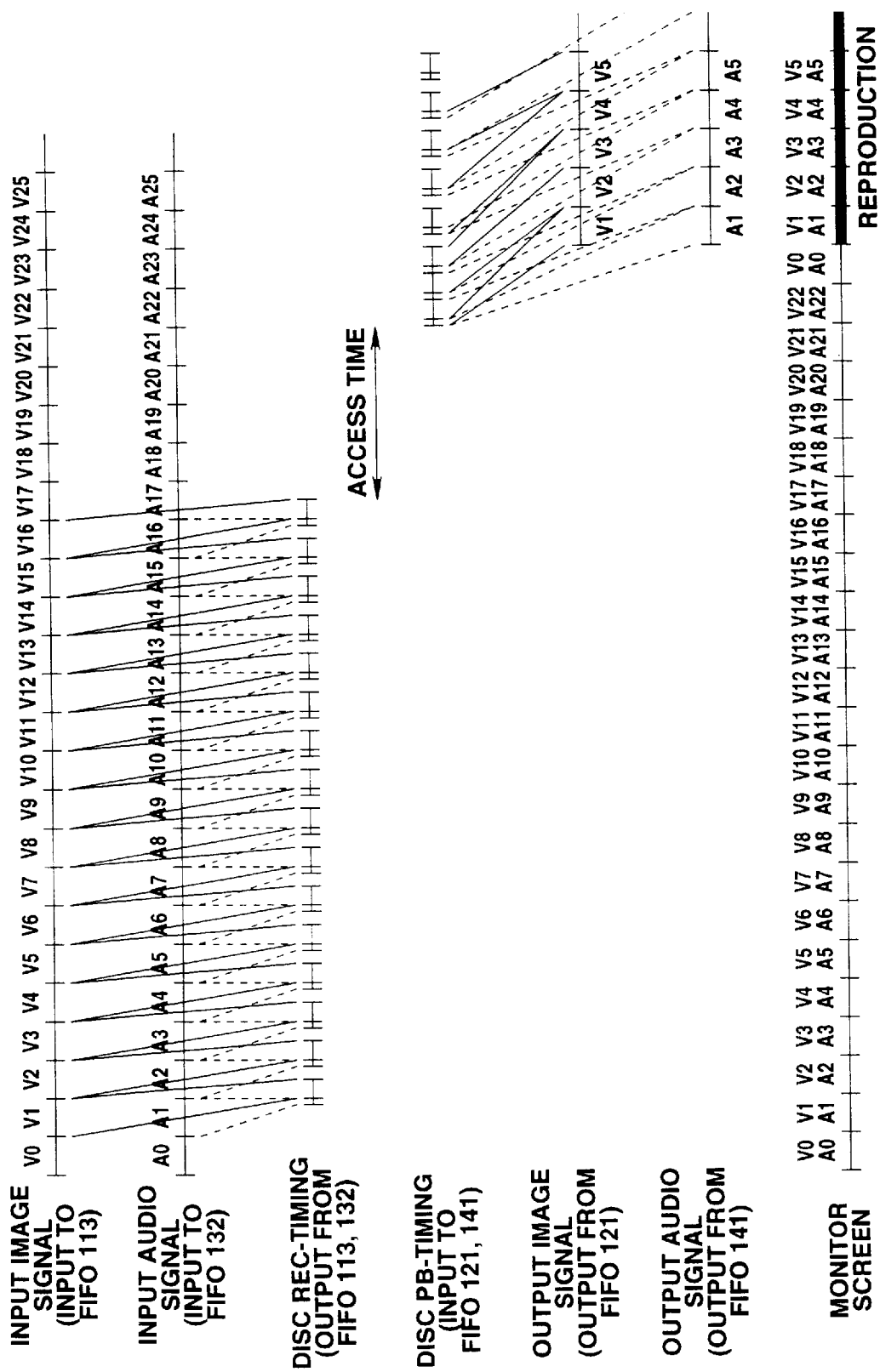
FIG. 4 is a time chart for explaining the recording and reproducing operations of the recording and reproducing apparatus according to the present invention.

FIG. 4 is a timing chart of input or output data to and from the buffers 113, 121, 132 and 141 when a recording operation and a reproducing operation are performed. Each frame of image data V0, V1, V2, . . . , and audio data A0, A1, A2, . . . , indicates one field time of the image signal.

In the recording and reproducing apparatus 100, the compression processing circuit 112 and the expansion circuit 122 compress and expand the image signal in a real time manner.

Figure 5:
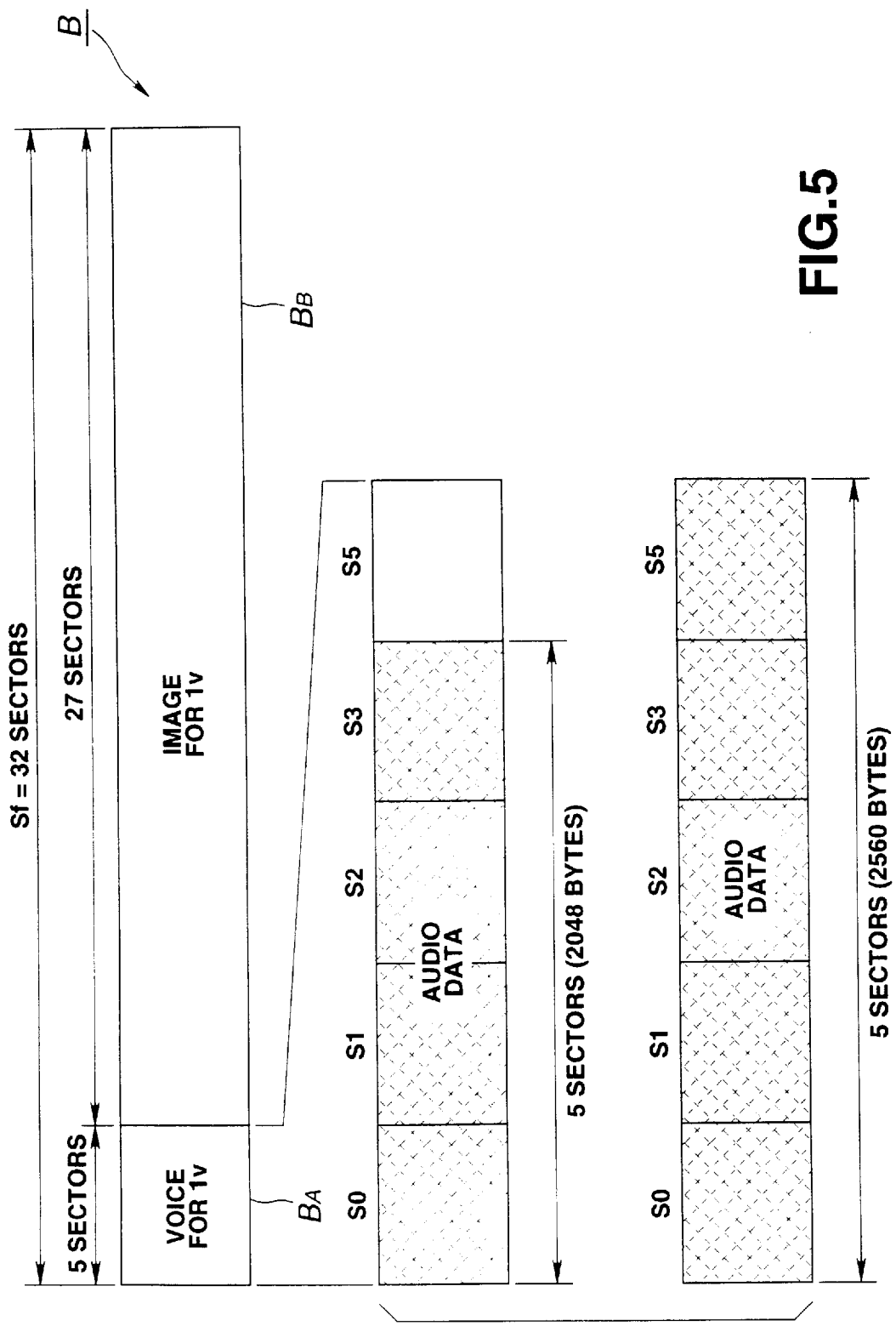
FIG. 5 is a diagram showing the disk format for use in the recording and reproducing apparatus according to the present invention.

FIG. 5 is a diagram showing a recording format of the disk 160. As shown in FIG. 3, the disk 160 is regulated such that file size $S_f$ of each of voice for 1 V and an image for 1 V has a size of 32 sectors. Thus, data is continuously recorded on the disk 160 with format blocks B each having the file size $S_f$ regulated to 32 sectors.

The format block B is divided into block $B_A$ having five sectors (=2560 bytes) S0 to S4 and block $B_B$ having 27 sectors (=13824 bytes). Image data is recorded in the block $B_B$, while audio data is recorded in the block $B_A$.

Referring to FIGS. 3 to 5, the operation of the recording and reproducing apparatus 100 will now be described.

Initially, the operation will now be described which is performed when a standard image signal, that is, an image signal having 262.5 horizontal scanning lines in 1 V has been supplied to the recording and reproducing apparatus 100.

In this case, audio data for 1 V which is generated when the standard image signal has been supplied, is about 586 words (=2344 bytes) when sampling has been performed at 35.15625 KHz. The amount of 2344 bytes is an amount which can be included in five sectors (=2560 bytes) of the disk 160 defined that 512 bytes form one sector.

Therefore, the system controller 150 previously sets the critical point of data which can be stored in the audio recording buffer 132 to be 5 sectors. When the stored amount of data has exceeded 2560 bytes, the audio recording buffer 132 sets the upper flag $F_{up}$ to be "1", and then outputs the same to the system controller 150.

That is, when an image signal and an audio signal are recorded on the disk 160, the A/D converter 111 digitizes the image signal supplied through the input terminal $I_{inB}$, and then supplies the digitized image signal to the compression processing circuit 112 as image data.

At this time, the synchronization separation circuit 114 extracts a vertical synchronizing signal from the signal supplied through the input terminal $I_{inB}$ to supply the same to each of the compression processing circuit 112, the expansion circuit 122 and the system controller 150.

In synchronization with the vertical synchronizing signal supplied from the synchronization separation circuit 114, the compression processing circuit 112 encodes image data supplied from the A/D converter 111 to write the same on the image recording buffer 113.

On the other hand, the A/D converter 131 digitizes the audio signal supplied through the input terminal $I_{inA}$ so as to write the digitized audio signal on the audio recording buffer 132 as audio data.

Therefore, as shown in FIG. 4, image data V1 obtained by encoding the image signal supplied in the period V1 is written on the image recording buffer 113, while audio data A1 is written on the audio recording buffer 132 at the same timing as the timing at which image data V1 is written on the image recording buffer 113.

When the image recording buffer 113 has stored image data for one vertical synchronizing period (V), that is, image data V1, the image recording buffer 113 sets the full flag $F_{fu}$ to be "1" to output the same to the system controller 150.

If the amount of stored audio data is not larger than 2560 bytes, the audio recording buffer 132 sets the upper flag $F_{up}$ to be "0". If the amount of stored audio data is not smaller than 2560 bytes, the audio recording buffer 132 sets the upper flag $F_{up}$ to be "1". Thus, the audio recording buffer 132 outputs the upper flag $F_{up}$ set to be "1" or "0" to the system controller 150.

That is, when audio data Al is stored, the audio recording buffer 132 sets the upper flag $F_{up}$ to be "0" because the amount of stored data is 2344 bytes so as to output the same to the system controller 150.

When the system controller 150 has recognized that image data for 1 V has been stored in the image recording buffer 113 in accordance with the full flag $F_{fu}$ (="1") supplied from the image recording buffer 113, the system controller 150 issues, to the disk drive 170, address at which data must be recorded on the disk 160, commands and the like. Then, the system controller 150 is brought to a waiting state for supply of transfer permission flag $F_{ok}$ from the disk drive 170.

In accordance with the address and the commands supplied from the system controller 150, the disk drive 170 outputs transfer permission flag $F_{ok}$ to the system controller 150.

When the system controller 150 recognizes output of the transfer permission flag $F_{ok}$ from the disk drive 170, the system controller 150 reads audio data for four sectors (=2048 bytes) stored in the j332 in accordance with the set value (="0") of the upper flag $F_{up}$ supplied from the audio recording buffer 132 so as to supply read audio data to the disk drive 170.

The system controller 150 has a non-volatile memory (not shown) to store information indicating reading of audio data for four sectors from the audio recording buffer 132, information above being stored as management information.

When image data is recorded, the system controller 150, as shown in FIG. 5, supplies, to the disk drive 170, a command indicating a fact that image data is recorded from the address skipping sector S4, which is the fifth sector in the block $B_A$ for audio data.

As described above, the system controller 150 supplies, to the disk drive 170, audio data for four sectors read from the audio recording buffer 132 and the address in the disk 160 at which data must be recorded, and the commands. Moreover, the system controller 150 reads image data for 1 V stored in the image recording buffer 113 to supply read image data to the disk drive 170.

When stored image data for 1 V has been read by the system controller 150, the image recording buffer 113 sets the full flag $F_{fu}$ to be "0".

In accordance with the address and the commands supplied from the system controller 150, the disk drive 170 records audio data for four sectors supplied from the system controller 150 to a predetermined address in the disk 160. Moreover, the disk drive 170 records image data supplied from the system controller 150 to the address skipped by one sector from the address at which audio data for four sectors has been recorded.

Therefore, in the disk format shown in FIG. 5, audio data A1 is recorded in sectors S0 to S3 of the block $B_A$ in accordance with the set value (="0") of the upper flag $F_{up}$ output from the audio recording buffer 132. Moreover, image data V1 is recorded in the block $B_B$ skipping the sector S4.

Similarly to the operation for recording image data V1 and audio data A1, the image recording buffer 113 stores image data V2 in the next 1 V. On the other hand, the audio recording buffer 132 stores audio data A2.

When the image recording buffer 113 has stored image data V2, the image recording buffer 113 sets the full flag $F_{fu}$ to be "1" to output the same to the system controller 150.

At this time, residual data (=2344−2048=296 bytes) generated when audio data A1 has been recorded and audio data A2 (=2344 bytes) have been stored in the audio recording buffer 132. That is, audio data in a quantity of 2640 bytes has been stored in the audio recording buffer 132.

Thus, the audio recording buffer 132 recognizes that the amount of stored data is larger than 5 sectors (=2560 bytes) and sets the upper flag $F_{up}$ to be "1" so as to output the same to the system controller 150.

When the system controller 150 has recognized that image data for 1 V has been stored in the image recording buffer 113 in accordance with the full flag $F_{fu}$ (="1") supplied from the image recording buffer 113, the system controller 150 issues the address in the disk 160, to which data must be recorded, commands and the like to the disk drive 170. Then, the system controller 150 is brought to a waiting state for supply of the transfer permission flag $F_{ok}$ from the disk drive 170.

The disk drive 170 outputs the transfer permission flag $F_{ok}$ to the system controller 150 in accordance with the address and the command supplied from the system controller 150.

When the system controller 150 has recognized output of the transfer permission flag $F_{ok}$ from the disk drive 170, the system controller 150 reads audio data for 5 sectors (=2560 bytes) stored in the audio recording buffer 132 in accordance with the set value (="1") of the upper flag $F_{up}$ supplied from the audio recording buffer 132 so as to supply read audio data to the disk drive 170.

Moreover, the system controller 150 stores information indicating reading of audio data for 5 sectors from the audio recording buffer 132, information above being stored as management information.

When the system controller 150 records image data V2, the system controller 150 supplies, to the disk drive 170, a command indicating that skipping is not performed and image data V2 is recorded from the address following audio data.

Then, the system controller 150 reads image data V2 stored in the image recording buffer 113 so as to supply the same to the disk drive 170.

In accordance with the address and the command supplied from the system controller 150, the disk drive 170 records audio data supplied from the system controller 150 to the address following image data V1. Moreover, the disk drive 170 records image data V2 supplied from the system controller 150 to the address following audio data.

As a result of the repeated recording operations, audio data A1 for four sectors, image data V1 for 1 V, audio data A2 for five sectors, image data V2 for 1 V, . . . , are recorded on the disk 160.

As described above, the recording and reproducing apparatus 100 is structured such that audio data is recorded on the disk 160 in such a manner that audio data is not always recorded in a predetermined number of sector units. In accordance with the amount of data stored in the audio recording buffer 132, the number of sectors for recording audio data is changed to four or five.

When audio data is recorded on the disk 160, the recording and reproducing apparatus 100 is structured to store the number of sectors which have stored audio data as management information. Management information above is used when the recording and reproducing apparatus 100 performs the reproducing process.

The operation for reproducing the disk 160 having image data and audio data stored therein is performed by using management information as follows. When the system controller 150 recognizes setting of the reproducing mode in accordance with the key operation or the like performed by the user, the system controller 150 issues, to the disk drive 170, the address and the command for reproducing audio data A1 for four sectors because of a fact that audio data A1 to be initially reproduced from the disk 160 has a volume of four sectors recognized in accordance with management information stored when the recording process has been performed. Moreover, the system controller 150 issues, to the disk drive 170, the address and commands for reproducing image data V1 from the address skipped by one sector from the address on which audio data A1 has been recorded. Then, the system controller 150 is brought to a waiting state for supply of transfer permission flag $F_{ok}$ from the disk drive 170.

In accordance with the address and commands supplied from the system controller 150, the disk drive 170 supplies the transfer permission flag $F_{ok}$ to the system controller 150. Then, the disk drive 170 reproduces audio data Al for four sectors from the disk 160. Moreover, the disk drive 170 reproduces image data V1 from the address skipped by one sector from the address on which audio data A1 has been recorded.

When the system controller 150 has recognized supply of the transfer permission flag $F_{ok}$ from the disk drive 170, the system controller 150 writes audio data A1 reproduced from the disk drive 170 on the audio reproducing buffer 141. Moreover, the system controller 150 writes image data V1 reproduced from the disk drive 170 on the image reproducing buffer 121.

In accordance with management information above, a fact can be recognized that audio data A2 to be reproduced next has been recorded on the disk 160 in a quantity of five sectors. Therefore, the system controller 150 issues, to the disk drive 170, the address and commands for reproducing audio data A2 for five sectors. Moreover, the system controller 150 issues, to the disk drive 170, the address and commands for reproducing image data V2 from the address following audio data A2. Then, the system controller 150 is brought to a waiting state for supply of transfer permission flag $F_{ok}$ from the disk drive 170.

In accordance with the address and commands supplied from the system controller 150, the disk drive 170 supplies transfer permission flag $F_{ok}$ to the system controller 150. Then, the disk drive 170 reproduces audio data A2 for five sectors from the disk 160, and then reproduces image data V2 from the address following audio data.

When the system controller 150 has recognized that the transfer permission flag $F_{ok}$ has been supplied from the disk drive 170, the system controller 150 writes audio data A2 reproduced from the disk drive 170 on the audio reproducing buffer 141. Moreover, the system controller 150 writes image data V2 reproduced from the disk drive 170 on the image reproducing buffer 121.

As described above, the system controller 150 sequentially issues, to the disk drive 170, addresses in the disk 160, on which data to be reproduced has been recorded, and commands in accordance with management information stored when the recording operation has been performed. The disk drive 170 sequentially reproduces audio data A1, image data V1, audio data A2, image data V2, . . . , from the disk 160 in accordance with the address and commands supplied from the system controller 150.

At this time, the image reproducing buffer 121 sets the empty flag $F_{em}$ to be "1" and outputs the same to the system controller 150 until it stores image data for 3 V to request the system controller 150 to transfer data.

The system controller 150 issues the address of the disk 160 and commands to the disk drive 170 until image data for 3 V is stored in the image reproducing buffer 121 in accordance with the empty flag $F_{em}$ (="1") supplied from the image reproducing buffer 121. Then, the system controller 150 writes, on the audio reproducing buffer 141 and the image reproducing buffer 121, audio data and image data reproduced by the disk drive 170.

When the image reproducing buffer 121 has stored image data for 3 V, that is, image data V1, V2 and V3, the image reproducing buffer 121 sets the empty flag $F_{em}$ to be "0" and outputs the same to the system controller 150 so that the request made to the system controller 150 to transfer data is temporarily completed. Then, the image reproducing buffer 121 outputs image data for 1 V, that is, image data V1 to the expansion circuit 122.

Simultaneously, also the audio reproducing buffer 141 outputs audio data A1 to the D/A converter 142.

The image reproducing buffer 121 outputs image data V1 to the expansion circuit 122, and then again sets the empty flag $F_{em}$ to be "1" to output the same to the system controller 150 so as to again request the system controller 150 to transfer data.

As a result, the system controller 150 issues the address and commands for reproducing next audio data A4 and image data V4 to the disk drive 170.

In synchronization with the vertical synchronizing signal supplied from the synchronization separation circuit 114, the expansion circuit 122 decodes image data V1 supplied from the image reproducing buffer 121 so as to supply the same to the D/A converter 123.

The D/A converter 123 converts image data supplied from the expansion circuit 122 into an analog signal so as to supply the same to the switch 124 as an image signal.

At this time, the image data supplied through the input terminal $I_{inB}$ and the image signal supplied from the D/A converter 123 are supplied to the switch 124. Therefore, a switch control circuit (not shown) controls the switching operation of the switch 124 to cause the image signal supplied from the D/A converter 123 to be output.

As a result, the switch 124 supplies the image signal supplied from the D/A converter 123 to a monitor (not shown) through the output terminal $I_{outB}$.

The D/A converter 142 converts audio data A1 supplied from the audio reproducing buffer 141 into an analog signal to supply the same to the loud speaker unit (not shown) through the output terminal $I_{outA}$ as an analog signal.

As a result of the repeated reproducing operations, image data V1, V2, V3, . . . , and audio data A1, A2, A3, . . . , recorded on the disk 160 are reproduced. An image formed in accordance with the reproduced image signal obtained from the disk 160 is displayed on the monitor. Moreover, voice corresponding to the image displayed on the monitor is output from the loud speaker unit.

As described above, the recording and reproducing apparatus 100 has such a structure that the system controller 150 uses management information stored when the recording operation has been performed. Thus, audio data for four or five sectors stored in the disk 160 can accurately be reproduced.

Then, the operation will now be described which is performed when a non-standard image signal, that is, an image signal, the number of horizontal scanning lines of which is not 262.5 in 1 V, has been supplied to the recording and reproducing apparatus 100.

The recording operation and reproducing operation of each element which is performed when the non-standard image signal has been supplied to the recording and reproducing apparatus 100 are similar to the operations which are performed when the standard image signal has been supplied to the recording and reproducing apparatus 100. Therefore, the detailed description of each element is omitted here. Hereinafter, the timing chart shown in FIG. 4 is used to describe the operations for recording and reproducing audio data to and from the disk 160 will mainly be described.

When a non-interlace image signal having 263 horizontal scanning lines in 1 V has been supplied to the recording and reproducing apparatus 100, audio data which is generated in 1 V is about 588 words (=2352 bytes) if sampling is performed at 35.15625 KHz. Since the foregoing amount of 2352 bytes can be included in five sectors (=2560 bytes) of the disk 160 defined that 512 bytes form one sector, the system controller 150 also previously sets the critical point for the amount of data which can be stored in the audio recording buffer 132 to five sectors.

Therefore, when image data V1 is recorded, audio data A1 having a quantity of 2352 bytes is stored in the audio recording buffer 132.

Since the quantity of data stored in the audio recording buffer 132 is not larger than five sectors (=2560 bytes) at this time, the upper flag $F_{up}$ output from the audio recording buffer 132 has been set to be "0".

As a result, audio data Al for four sectors is recorded on the disk 160 so that image data V1 is recorded to the address skipped by one sector from the address to which audio data A1 has been recorded.

When image data V2 is recorded, residual data (=2352−2048=304 bytes) generated when image data V1 has been recorded and 2352 bytes of audio data A2 have been stored in the audio recording buffer 132. That is, the quantity of data stored in the audio recording buffer 132 is 2656

(=2352+304) bytes. Therefore, the upper flag $F_{up}$ output from the audio recording buffer 132 has been set to be "1".

As a result, audio data A2 for five sectors (=2560 bytes) are recorded on the disk 160, and image data V2 is recorded to the address following the address to which audio data A2 has been recorded.

When next image data V3 is recorded, residual data (=2656−2560=96 bytes) generated when image data V2 has been recorded and 2352 bytes of audio data A3 are stored in the audio recording buffer 132 in a quantity of 2445 (=2352+96) bytes. That is, the quantity of data stored in the audio recording buffer 132 is not larger than five sectors (=2560 bytes). Therefore, the upper flag $F_{up}$ output from the audio recording buffer 132 has been set to be "0".

As a result, audio data A3 for four sectors are recorded, while image data V3 is recorded to the address skipped by one sector from the address to which audio data A3 has been recorded.

When next image data V4 is recorded, residual data (=2448−2048=400 bytes) generated when image data V3 has been recorded and 2352 bytes of audio data A4 have been stored in the audio recording buffer 132. That is, the quantity of data stored in the audio recording buffer 132 is 2752 (=2352+400) bytes. Therefore, the upper flag $F_{up}$ output from the audio recording buffer 132 has been set to be "1".

As a result, audio data A4 for five sectors is recorded on the disk 160, while image data V4 is recorded to the address following the address to which audio data A4 has been recorded.

Therefore, even if the non-standard image signal has been supplied to the recording and reproducing apparatus 100, the foregoing recording operation is repeated. As a result, audio data A1 for four sectors, image data V1 for 1 V, audio data A2 for five sectors, image data V2 for 1 V, . . . , are recorded on the disk 160.

As described above, the recording and reproducing apparatus 100 is structured such that audio data is recorded on the disk 160 in such a manner that audio data is not always recorded in a predetermined number of sector units. In accordance with the amount of data stored in the audio recording buffer 132, the number of sectors for recording audio data is changed to four or five. Therefore, even if a non-standard image signal has been supplied to the recording and reproducing apparatus 100, management of audio data to be recorded on the disk 160 can accurately be performed. Therefore, voice cannot be interrupted and data does not overlap. Thus, the operation for recording the image signal and the audio signal on to the disk 160 can accurately be performed.

When the disk 160, on which image data and audio data have been recorded is reproduced, audio data A1 for four sectors is initially reproduced from the disk 160 in accordance with management information stored by the system controller 150 when the recording operation is performed. Then, image data V1 is reproduced from the address skipped by one sector from the address to which audio data Al has been recorded.

Then, in accordance with management information, audio data A2 for five sectors is reproduced from the disk 160, and image data V2 is reproduced from the address following audio data A2.

Then, in accordance with management information, audio data A3 for four sectors is reproduced from the disk 160, and image data V3 is reproduced from the address skipped by one sector from the address to which audio data A3 has been recorded.

When audio data A1, A2 and A3 and image data V1, V2 and V3 have been reproduced in a quantity for 3 V, image data for 1 V is supplied from the image reproducing buffer 121 to the expansion circuit 122. Simultaneously, audio data for 1 V is supplied from the audio reproducing buffer 141 to the D/A converter 142.

Thus, 588 words (=2352 bytes) of audio data are output from the audio reproducing buffer 141 to the D/A converter 142 in the period of 1 V. The empty flag $F_{em}$ output from the image reproducing buffer 121 to the system controller 150 has been set to be "1" in a case where the quantity of data stored in the image reproducing buffer 121 is smaller than the quantity for 3 V. Therefore, when the quantity of data stored in the image reproducing buffer 121 is smaller than the quantity for 3 V, a request is made to the system controller 150 to transfer data. Thus, audio data A4 and image data V4 are written on the audio reproducing buffer 141 and the image reproducing buffer 121. Therefore, audio data in a quantity larger than the quantity for 1 V is always stored in the audio reproducing buffer 141. Therefore, the audio reproducing buffer 141 is able to constantly supply audio data for 1 V to the D/A converter 142.

As a result of the foregoing repeated reproducing operation, image data V1, V2, V3, . . . , and audio data A1, A2 and A3 recorded on the disk 160 are reproduced.

As described above, the recording and reproducing apparatus 100 is structured to reproduce audio data and image data from the disk 160 in accordance with management information stored by the system controller 150 when the recording operation has been performed. Therefore, even if a non-standard image signal has been supplied, audio data and image data can accurately be reproduced from the disk 160. That is, even if a non-standard image signal has been supplied to the recording and reproducing apparatus 100, high quality voice and image can be obtained from the disk 160.

The foregoing recording and reproducing apparatus 100 has such a structure that management information indicating whether audio data recorded on the disk 160 is audio data for four sectors or audio data for five sectors is stored in the non-volatile memory (not shown). Another structure may be employed in which a non-volatile memory is provided for the disk drive 170 and in which management information is written to the memory of the disk drive 170 when the recording operation is performed and when the reproducing operation is performed, management information is read from the disk drive 170 so as to be used in the reproducing operation.

Figure 6:
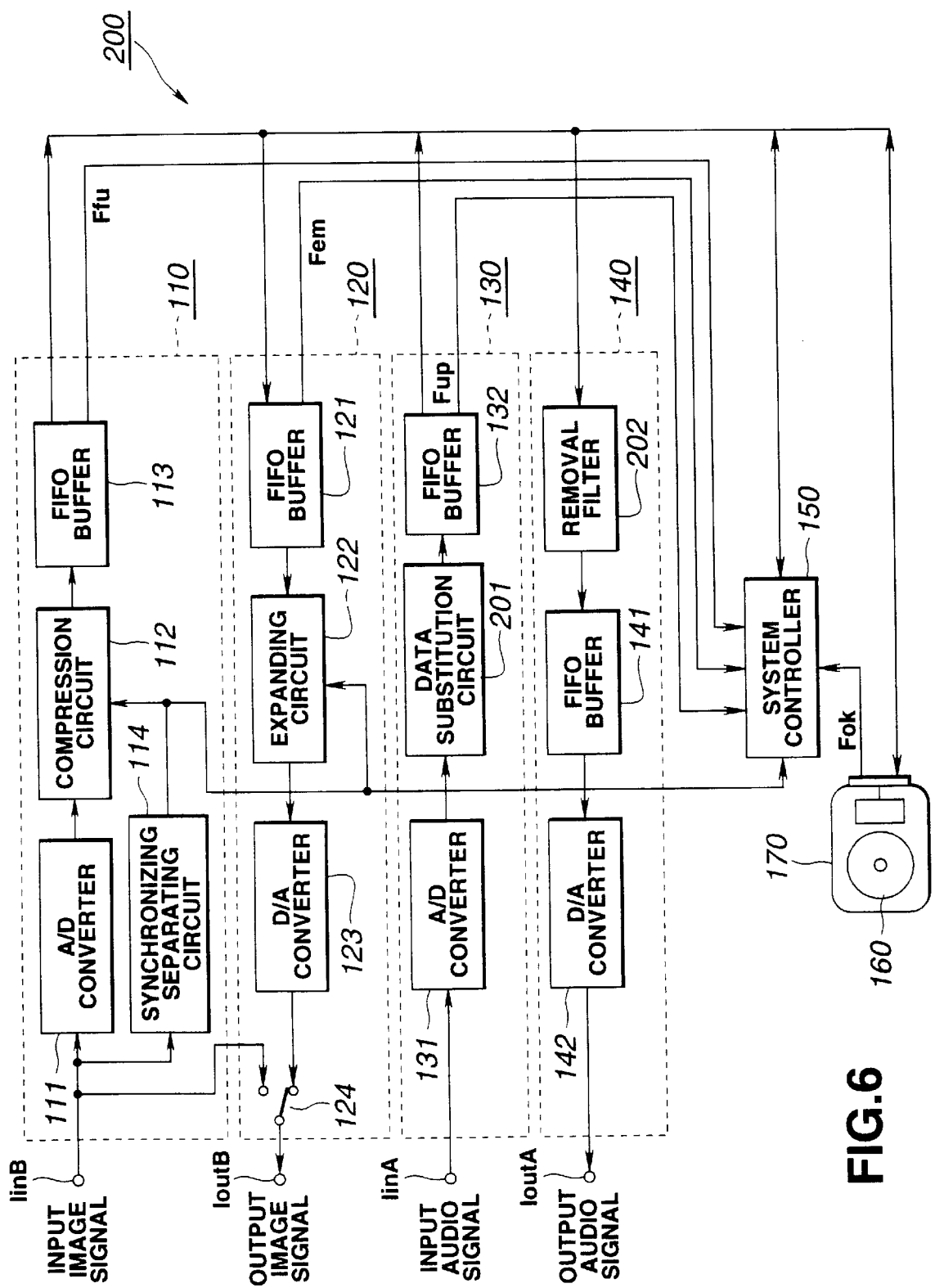
FIG. 6 is a block diagram showing the structure of a recording and reproducing apparatus having a data substitution circuit and a removal filter.

The recording and reproducing apparatus according to the present invention is applied to, for example, a recording and reproducing apparatus 200 formed as shown in FIG. 6.

The recording and reproducing apparatus 200 has a structure formed by adding a data substitution circuit 201 and a stuffing code removal filter (hereinafter simply called removal filter) 202 to the elements of the recording and reproducing apparatus 100 shown in FIG. 3.

That is, the data substitution circuit 201 is disposed adjacent to the input portion of the audio recording buffer 132, while the removal filter 202 is disposed adjacent to the input portion of the audio reproducing buffer 141.

Note that elements of the recording and reproducing apparatus 200 shown in FIG. 4 which are operated similarly to those of the recording and reproducing apparatus 100 shown in FIG. 3 are given the same reference numerals and the same elements are omitted from description.

When an audio signal is observed in view of PCM (pulse code modulation) code, the dynamic range of the audio signal is expressed by a complement of two from 8000h to 7FFFh. Since the frequency of generation of 8000h which is data having a width of the foregoing dynamic range is considerably low, problem won't arises if 8001h is substituted for 8000h.

Accordingly, the data substitution circuit 201 subjects audio data obtained by the A/D converter 131 to a substitution process for substituting 8001h for 8000h.

Therefore, audio data, in which 8001h has been substituted for 8000h, is written on the audio recording buffer 132.

The operation of the recording and reproducing apparatus 200 which is performed when a non-standard image signal having 263 horizontal scanning lines for 1 V has supplied will now be described with reference to a time chart shown in FIG. 4.

When image data V1 is recorded, 2352 bytes of audio data A1 are stored in the audio recording buffer 132.

Since the quantity of data stored in the audio recording buffer 132 is not larger than five sectors (=2560 bytes) at this time, the upper flag $F_{up}$ output from the audio recording buffer 132 has been set to be "0".

As a result, the system controller 150 reads audio data for four sectors from the audio recording buffer 132 to supply audio data above to the disk drive 170. When image data V1 is recorded, the system controller 150 supplies, to the disk drive 170, a command to record image data to the address skipped by one sector from the address to which audio data A1 has been recorded.

The above-mentioned recording and reproducing apparatus 100 must have such a structure that management information indicating whether audio data for four sectors has been read from the audio recording buffer 132 or audio data for five sectors has been read from the same is stored by the system controller 150. However, the system controller 150 of the foregoing recording and reproducing apparatus 200 is not required to store management information. As a result, the load of the system controller 150 of the recording and reproducing apparatus 200 can be reduced.

Figure 7:
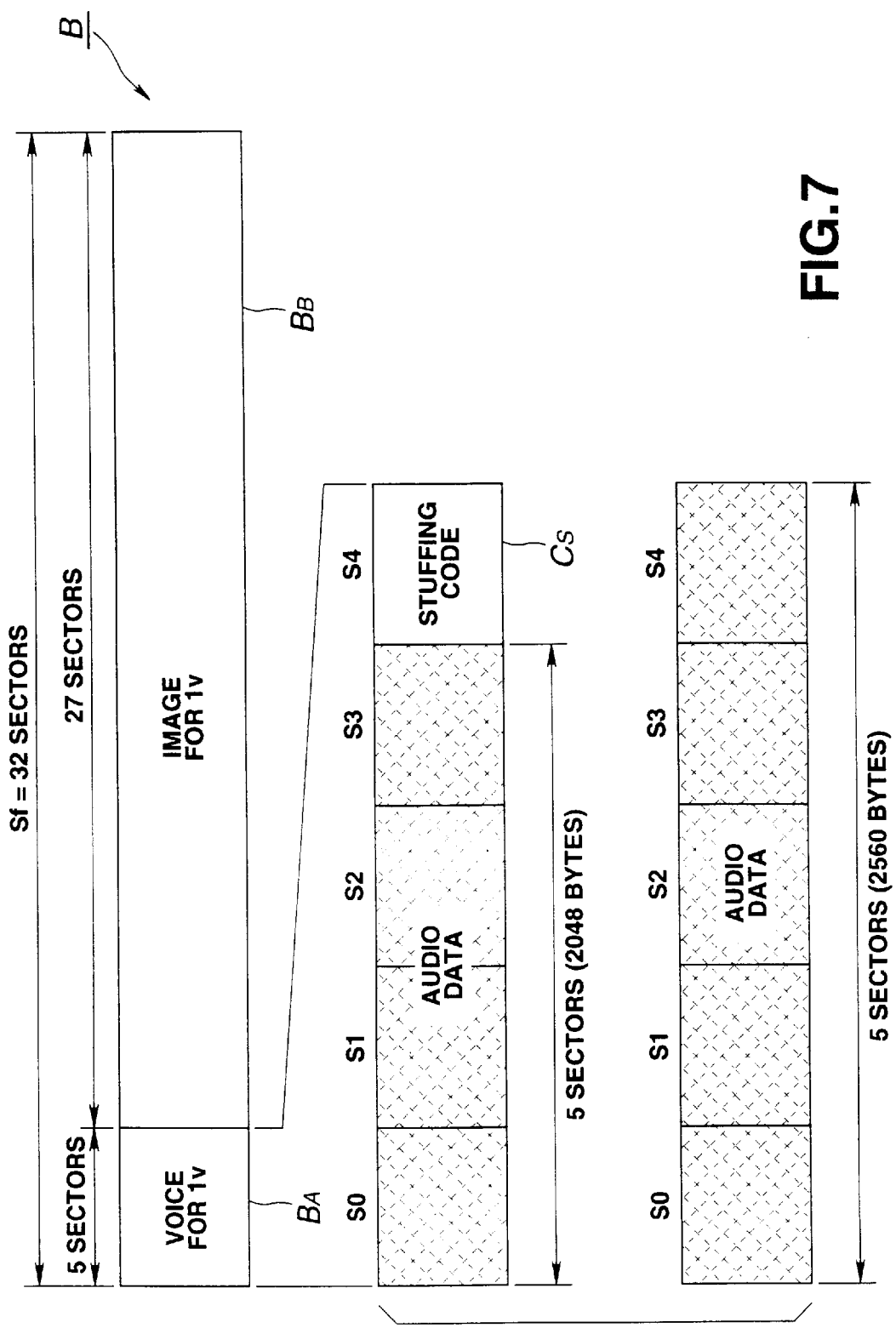
FIG. 7 is a diagram showing the disk format for use in the above-mentioned recording and reproducing apparatus.

The disk drive 170, as shown in FIG. 7, records, to sectors S0 to S3 of the disk 160, audio data A1 for four sectors supplied from the audio recording buffer 132 in accordance with the address and commands supplied from the system controller 150. The system controller 150 records 8000h onto next sector S4 in a quantity of 256 words (=one sector) as stuffing code Cs. The disk drive 170 records image data V1 from the address following sector S4 to which the stuffing code Cs has been recorded.

Therefore, audio data A1 for four sectors and stuffing code Cs for one sector are recorded on the disk 160. Then, image data V1 is recorded from the address following the stuffing code Cs.

When next image data V2 is recorded, residual data (=2352−2048=304 bytes) generated when image data V1 has been recorded and 2352 bytes of audio data A2 have been stored in the audio recording buffer 132. That is, the quantity of data stored in the audio recording buffer 132 is 2656 (=2352+304) bytes. Therefore, the upper flag $F_{up}$ output from the audio recording buffer 132 is set to be "1".

As a result, audio data A2 for five sectors (=2560 bytes) is recorded on the disk 160. Moreover, image data V2 is recorded following the address to which audio data A2 has been recorded.

When next image data is recorded, residual data (=2656−2560=96 bytes) generated when image data V2 has been recorded and 2352 bytes of audio data A3 have been stored in the audio recording buffer 132. That is, the quantity of data stored in the audio recording buffer 132 is 2448 (=2352+96) bytes which are smaller than the quantity for five sectors (=2560 bytes). Therefore, the upper flag $F_{up}$ output from the audio recording buffer 132 has been set to be "0".

As a result, similarly to the operation for recording image data V1, audio data A3 for four sectors and stuffing code Cs for one sector are recorded on the disk 160. Moreover, image data V3 is recorded from the address following the stuffing code $C_s$.

When next image data V4 is recorded, residual data (=2448−2048=400 bytes) generated when image data V3 has been recorded and 2352 bytes of audio data A4 have been stored in the audio recording buffer 132. That is, the quantity of data stored in the audio recording buffer 132 is 2752 (=2352+400) bytes. Therefore, the upper flag $F_{up}$ output from the audio recording buffer 132 has been set to be "1".

As a result, audio data A4 for five sectors are recorded on the disk 160. Then, image data V4 is recorded following the address to which audio data A4 has been recorded.

Also when image data V5, V6, . . . , is recorded, audio data for four sectors or five sectors is sequentially recorded on the disk 160 in accordance with the quantity of data stored in the audio recording buffer 132. When audio data for four sectors is recorded, the stuffing code $C_s$ is recorded on the one trailing sector.

When the disk 160, on which image data, audio data and the stuffing code $C_s$ have been recorded, is reproduced, audio data A1 for five sectors is initially reproduced from the disk 160. Then, image data V1 is reproduced from the following address.

When the system controller 150 writes audio data reproduced from the disk 160 on the audio reproducing buffer 141, audio data above is allowed to pass through the removal filter 202 so that only audio data for four sectors obtained by removing the stuffing code $C_s$ at the fifth sector is written on the audio reproducing buffer 141.

That is, the removal filter 202 is a filter for removing stuffing code $C_s$ of 8000h from audio data for five sectors reproduced from the disk 160. Since audio data reproduced from the disk 160 is supplied to the audio reproducing buffer 141 through the removal filter 202, only audio data for four sectors is written on the audio reproducing buffer 141.

Then, audio data A2 for five sectors is reproduced from the disk 160, and then image data V2 is reproduced from the following address.

Since the stuffing code $C_s$ is not included in audio data for five sectors reproduced from the disk 160, the overall portion of audio data for five sectors is written on the audio reproducing buffer 141.

Then, audio data A3 for five sectors is reproduced from the disk 160, and then image data V3 is reproduced from the following address.

Also in this case, only audio data for four sectors obtained by removing the stuffing code $C_s$ by the removal filter 202 is written on the audio reproducing buffer 141.

When audio data A1, A2 and A3 and image data V1, V2 and V3 have been reproduced in a quantity for 3 V, image data for 1 V is supplied from the image reproducing buffer 121 to the expansion circuit 122. Simultaneously, audio data for 1 V is supplied from the audio reproducing buffer 141 to the D/A converter 142.

Then, similarly to the operation for reproducing audio data A1, A2 and A3 and image data V1, V2 and V3, image data V4, V5, . . . , and audio data A4, A5, . . . , are sequentially reproduced from the disk 160.

As described above, the recording and reproducing apparatus 200 uses 8000h as stuffing code $C_s$. When audio data for four sectors is recorded on the disk 160, the stuffing code $C_s$ is recorded on one residual sector. When audio data is reproduced from the disk 160, reproduction is performed by skipping the stuffing code $C_s$. Therefore, the system controller 150 is not required to manage the number of sectors for the audio data written on the disk 160.

Therefore, if a standard image signal has been supplied to the recording and reproducing apparatus 200 or if a non-standard image signal has been supplied, voice cannot be interrupted and data does not overlap. Thus, image data and audio data can accurately be recorded on the disk 160, and audio data and image data can accurately be reproduced from the disk 160. Moreover, load of the system controller 150 can be reduced. As a result, the recording and reproducing apparatus 200 is able to improve the processing efficiency.

The recording and reproducing apparatus according to the present invention has the storage means for temporarily storing an audio signal to be recorded on the disk type recording medium and outputting storage information which is information of the quantity of the stored audio signal. The recording means changes the number of sectors of the disk type recording medium for recording the audio signal within a predetermined number of sectors in accordance with storage information when the recording means records the audio signals stored in the storage means on to the disk type recording medium. The memory means memorizes information of the number of the sectors of the disk type recording medium in which the audio signals have been recorded, the information being stored as management information. The reproducing means reproduces, in synchronization with the image signal, the audio signals recorded on the disk type recording medium in accordance with management information stored by the memory means. As a result, if a non-standard image signal has been supplied to the recording and reproducing apparatus according to the present invention, administration of the audio signal to be recorded on the disk type recording medium can accurately be performed. Therefore, voice is not interrupted and data does not overlap. Thus, the image signal and the audio signal can accurately be recorded to the disk type recording medium. Even if a non-standard image signal has been supplied to the recording and reproducing apparatus according to the present invention, the audio signal and the image signal can accurately be reproduced from the disk type recording medium. That is, even if a non-standard image signal has been supplied to the recording and reproducing apparatus according to the present invention, high quality audio and image signals can be obtained from the disk type recording medium.

The recording and reproducing apparatus according to the present invention has the storage means for temporarily storing an audio signal to be recorded on the disk type recording medium and outputting storage information which is information of the quantity of the stored audio signal. The recording means changes the number of sectors of the disk type recording medium for recording the audio signal within a predetermined number of sectors in accordance with storage information when the recording means records the audio signals stored in the storage means on to the disk type recording medium and records a predetermined code in a residual sector in a case where the number of the sectors for recording the audio signals is smaller than a predetermined number of sectors. The reproducing means reproduces, from the disk type recording medium, only audio signals from which the predetermined code has been removed. As a result, the recording and reproducing apparatus having the above-mentioned structure is not required to store information of the number of sectors of the disk type recording medium which has stored the audio signals as management information. Therefore, the load of the system controller and so forth for totally controlling the operations of the recording and reproducing apparatus can be reduced. As a result, the recording and reproducing apparatus according to the present invention is able to improve the processing efficiency. Thus, if a non-standard image signal has been supplied to the recording and reproducing apparatus according to the present invention, voice is not interrupted and data does not overlap. Therefore, the image signal and the audio signal can accurately be recorded to the disk type recording medium. That is, even if a non-standard image signal has been supplied to the recording and reproducing apparatus according to the present invention, high quality audio and image signals can be obtained from the disk type recording medium.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A recording and reproducing apparatus for recording an image signal and an audio signal on to a rewritable-disk-type recording medium while synchronizing the image signal and the audio signal with each other and for reproducing an image and voice from a rewritable-disk-type recording medium having image signals and audio signals recorded thereon while synchronizing the image and the voice with each other, said recording and reproducing apparatus comprising:

storage means for temporarily storing an audio signal to be recorded on said disk type recording medium and outputting storage information which is information of the quantity of the stored audio signals;

recording means for changing the number of sectors of said disk type recording medium for recording the audio signal within a predetermined number of sectors in accordance with storage information when said recording means records the audio signals stored in said storage means on to said disk type recording medium;

memory means for memorizing information of the number of the sectors of said disk type recording medium in which the audio signals have been recorded, said information being stored as management information; and reproducing means for reproducing the audio signals recorded on said disk type recording medium in accordance with management information stored by said memory means.

2. A recording and reproducing apparatus for recording an image signal and an audio signal on to a rewritable-disk-type recording medium while synchronizing the image signal and the audio signal with each other and for reproducing an image and voice from a rewritable-disk-type recording medium having image signals and audio signals recorded thereon while synchronizing the image and the voice with each other, said recording and reproducing apparatus comprising:

storage means for temporarily storing an audio signal to be recorded on said disk type recording medium and outputting storage information which is information of the quantity of the stored audio signals;

recording means for changing the number of sectors of said disk type recording medium for recording the audio signal within a predetermined number of sectors in accordance with storage information when said recording means records the audio signals stored in said storage means on to said disk type recording medium; and reproducing means for reproducing the audio signals recorded on said disk type recording medium, wherein said recording means records a predetermined code in a residual sector in a case where the number of the sectors for recording the audio signals is smaller than a predetermined number of sectors, and said reproducing means reproduces, from said disk type recording medium, only audio signals from which the predetermined code has been removed.

3. A recording and reproducing method of recording an image signal and an audio signal on to a rewritable-disk-type recording medium while synchronizing the image signal and the audio signal with each other and for reproducing an image and voice from a rewritable-disk-type recording medium having image signals and audio signals recorded thereon while synchronizing the image and the voice with each other, said recording and reproducing method comprising the steps of:

temporarily storing an audio signal to be recorded on said disk type recording medium and outputting storage information which is information of the quantity of the stored audio signals;

changing the number of sectors of said disk type recording medium for recording the audio signal within a predetermined number of sectors in accordance with storage information when the stored audio signals are recorded on said disk type recording medium;

memorizing information of the number of the sectors of said disk type recording medium in which the audio signals have been recorded, said information being stored as management information; and reproducing the audio signals recorded on said disk type recording medium in accordance with management information stored in said memorizing step.

4. A recording and reproducing method of recording an image signal and an audio signal on to a rewritable-disk-type recording medium while synchronizing the image signal and the audio signal with each other and for reproducing an image and voice from a rewritable-disk-type recording medium having image signals and audio signals recorded thereon while synchronizing the image and the voice with each other, said recording and reproducing method comprising the steps of:

temporarily storing an audio signal to be recorded on said disk type recording medium and outputting storage information which is information of the quantity of the stored audio signals;

changing the number of sectors of said disk type recording medium for recording the audio signal within a predetermined number of sectors in accordance with storage information when the stored audio signals are recorded on said disk type recording medium; and reproducing the audio signals recorded on said disk type recording medium, wherein a predetermined code is recorded in a residual sector in a case where the number of the sectors for recording the audio signals is, in said recording step, smaller than a predetermined number of sectors, and only audio signals from which the predetermined code has been removed are reproduced from said disk type recording medium in said reproducing step.

* * * * *